(12) United States Patent
Yamada et al.

(10) Patent No.: US 8,902,621 B2
(45) Date of Patent: Dec. 2, 2014

(54) POWER SUPPLY DEVICE FOR USE WITH SELECTABLE AC POWER SUPPLY VOLTAGE

(75) Inventors: Ryuji Yamada, Hachioji (JP); Kazuaki Mino, Hino (JP)

(73) Assignee: Fuji Electric Co., Ltd., Kawasaki-shi (JP)

(*) Notice: Subject to any disclaimer, the term of this patent is extended or adjusted under 35 U.S.C. 154(b) by 42 days.

(21) Appl. No.: 13/371,193

(22) Filed: Feb. 10, 2012

(65) Prior Publication Data
US 2012/0212984 A1 Aug. 23, 2012

(51) Int. Cl.
| H02M 7/155 | (2006.01) |
| H02M 7/219 | (2006.01) |
| H02M 7/23 | (2006.01) |
| H02M 1/00 | (2006.01) |

(52) U.S. Cl.
CPC ........ H02M 7/219 (2013.01); *H02M 2001/007* (2013.01); H02M 7/23 (2013.01)
USPC ................................ 363/129; 363/65; 363/87

(58) Field of Classification Search
CPC ....... H02M 7/06; H02M 7/08; H02M 7/1555; H02M 7/1557; H02M 7/1623; H02M 7/1626; H02M 1/32; H02M 3/33592; H02J 1/102; Y02B 70/126
USPC ........... 363/65, 67, 76, 77, 81, 84, 87, 88, 89, 363/125, 126, 127, 128, 129, 85
See application file for complete search history.

(56) References Cited

U.S. PATENT DOCUMENTS

| 4,449,176 | A | * | 5/1984 | Turnbull | 363/126 |
| 4,805,082 | A | * | 2/1989 | Heinrich et al. | 363/129 |
| 5,784,269 | A | * | 7/1998 | Jacobs et al. | 363/89 |
| 6,049,473 | A | * | 4/2000 | Jang et al. | 363/89 |
| 8,309,878 | B2 | * | 11/2012 | Winn | 363/65 |
| 2011/0149622 | A1 | * | 6/2011 | Lin | 363/124 |

FOREIGN PATENT DOCUMENTS

JP 11-275865 A 10/1999

* cited by examiner

*Primary Examiner* — Gary L Laxton
*Assistant Examiner* — Alex Torres-Rivera
(74) *Attorney, Agent, or Firm* — Rabin & Berdo, P.C.

(57) ABSTRACT

A power supply device that is able to switch between rectifier circuits in accordance with the voltage of a multi-phase AC power supply, and able to accommodate different power supply voltages. The power supply device has rectifier circuits that include a first circuit that rectifies a line voltage of the AC power supply, converting it into a direct current voltage of a first predetermined value, when the voltage of the AC power supply is a predetermined value or less, and a second circuit that rectifies a phase voltage of the AC power supply, converting it into a direct current voltage of a second predetermined value, when the voltage of the alternating current power supply exceeds the predetermined value. The first and second circuits operate in such a way that the AC input current is of the same phase as the voltage of the AC power supply.

6 Claims, 3 Drawing Sheets

POWER SUPPLY DEVICE FOR USE WITH SELECTABLE AC POWER SUPPLY VOLTAGE

BACKGROUND OF THE INVENTION

1. Technical Field

The present invention relates to a power supply device that converts N phases (N is a natural number of two or more) of alternating current voltage into a direct current voltage.

2. Related Art

FIG. 3 is a diagram for illustrating a power supply device disclosed in Japanese Patent No. 3900444. The power supply device converts a three-phase alternating current voltage into predetermined direct current voltages using three rectifier circuits. Next, the direct current voltages obtained by converting are converted by DC/DC converters, and output to a common load.

In FIG. 3, reference numeral 1a is a three-phase alternating current power supply, reference numerals 2a, 2b, and 2c are rectifier circuits, reference numerals 10a, 10b, and 10c are isolated DC/DC converters, and Cn is a capacitor arrangement. The rectifier circuits 2a, 2b, and 2c have the same circuit configuration, and perform the same circuit operation. Consequently, hereafter, the circuit configuration and circuit operation will be described with the rectifier circuit 2a as a representative.

The three-phase alternating current power supply 1a is a power supply wherein an R-phase, an S-phase, and a T-phase are star connected, and includes terminals R, S, and T of each phase. The star-connected capacitor Cn is connected to the terminals R, S, and T of the three-phase alternating current power supply 1a.

The rectifier circuit 2a includes alternating current input terminals A1a, A2a, and A3a, and direct current output terminals Pa and Na. The terminal A1a is connected to the terminal R of the three-phase alternating current power supply 1a. The terminal A2a is connected to the terminal S of the three-phase alternating current power supply 1a. The terminal A3a is connected to a neutral point of the capacitor arrangement Cn. A first series circuit wherein diodes D1a and D2a are connected in series, a second series circuit wherein thyristors Th1a and Th2a are connected in series, and a third series circuit wherein diodes D3a and D4a are connected in series, are connected in parallel between the terminals Pa and Na. A connection point of the diodes D1a and D2a of the first series circuit is connected to the terminal A1a. A connection point of the thyristors Th1a and Th2a of the second series circuit is connected to the terminal A2a. A connection point of the diodes D3a and D4a of the third series circuit is connected to the terminal A3a.

With the heretofore described circuit configuration, an on signal is input into the gates of the thyristors Th1a and Th2a when the three-phase alternating current power supply 1a is a 200V power supply. Because of this, the rectifier circuit 2a functions as a circuit that rectifies R-phase and S-phase line voltages of the three-phase alternating current power supply 1a with the first series circuit and second series circuit. Meanwhile, an off signal is input into the gates of the thyristors Th1a and Th2a when the three-phase alternating current power supply 1a is a 400V power supply. Because of this, the rectifier circuit 2a functions as a circuit that rectifies an R-phase phase voltage of the three-phase alternating current power supply 1a with the first series circuit and third series circuit.

The rectifier circuit 2b and rectifier circuit 2c have the same circuit configuration as the rectifier circuit 2a. Consequently, the rectifier circuit 2b functions as a circuit that rectifies S-phase and T-phase line voltages when the three-phase alternating current power supply 1a is a 200V power supply. The rectifier circuit 2b functions as a circuit that rectifies an S-phase phase voltage when the three-phase alternating current power supply 1a is a 400V power supply. Also, the rectifier circuit 2c functions as a circuit that rectifies T-phase and R-phase line voltages when the three-phase alternating current power supply 1a is a 200V power supply. The rectifier circuit 2c functions as a circuit that rectifies a T-phase phase voltage when the three-phase alternating current power supply 1a is a 400V power supply.

As a result of this, when the three-phase alternating current power supply 1a is a 200V power supply, a voltage wherein the line voltage of the three-phase alternating current power supply 1a has been full-wave rectified is output from the rectifier circuits 2a, 2b, and 2c. Also, when the three-phase alternating current power supply 1a is a 400V power supply, a voltage wherein the phase voltage of the three-phase alternating current power supply 1a has been full-wave rectified is output from the rectifier circuits 2a, 2b, and 2c.

The DC/DC converter 10a is connected to the direct current output terminals Pa and Na of the rectifier circuit 2a. In the same way, the DC/DC converter 10b is connected to direct current output terminals Pb and Nb of the rectifier circuit 2b, and the DC/DC converter 10c is connected to direct current output terminals Pc and Nc of the rectifier circuit 2c. The output terminals of the DC/DC converters 10a, 10b, and 10c are connected in parallel, and the direct current output voltages are supplied to the same load.

According to the technology disclosed in JP-A-3900444, the rectifier circuits 2a, 2b, and 2c are circuits wherein diodes are configured in a full wave bridge, or circuits wherein thyristors and diodes are configured in a hybrid bridge. Also, generally, a filter circuit formed by an inductor and a capacitor is provided in an input unit of the DC/DC converter. Consequently, the input power factor of the rectifier circuits 2a, 2b, and 2c, not reaching 1, is in the region of 0.8 to 0.9.

As a result of this, there is a problem in that the current capacity of the three-phase alternating current power supply 1a and rectifier circuits 2a, 2b, and 2c increases, and the power supply device increases in size.

SUMMARY OF THE INVENTION

The invention, attempting to solve the problem of this kind of power supply device, has an object of providing a small sized power supply device with a high power factor, with which differing alternating current voltages can be input.

In order to achieve the object, one aspect of the invention is a power supply device that converts the voltage of an alternating current power supply formed by N phases (N is a natural number of two or more) into a direct current voltage using M (M is a natural number equal to or greater than one, and equal to or smaller than N) rectifier circuits, wherein the rectifier circuit is configured to include a first circuit that converts a line voltage of the alternating current power supply into a direct current voltage of a first predetermined value by an alternating current of the same phase as the line voltage of the alternating current power supply being input, and a second circuit that converts a phase voltage of the alternating current power supply into a direct current voltage of a second predetermined value by an alternating current of the same phase as the phase voltage of the alternating current power supply being input.

By configuring the power supply device in this way, it is possible for the rectifier circuit alternating current input power factor to be a high power factor of approximately 1.0.

As a result of this, it is possible to reduce the current capacity of the rectifier circuit, and it is possible to reduce the size of the power supply device.

In this aspect of the invention, it is preferable that the rectifier circuit is caused to operate in either of a first mode, wherein the operation of the second circuit is stopped and the first circuit is caused to operate, and a second mode, wherein the operation of the first circuit is stopped and the second circuit is caused to operate. Furthermore, it is preferable that the rectifier circuit is caused to operate in the first mode when the effective value of the voltage of the alternating current power supply is a predetermined value or less, and caused to operate in the second mode when the effective value of the voltage of the alternating current power supply exceeds the predetermined value.

By causing the power supply device to operate in this way, it is possible to obtain a required direct current voltage with one power supply device, even when the power supply device is connected to an alternating current power supply with differing power supply voltages.

Also, in this aspect of the invention, it is preferable that the rectifier circuit is caused to operate in such a way that the first predetermined value and second predetermined value of the direct current voltage are the same.

By causing the rectifier circuit to operate in this way, it is possible to reduce the input voltage range of the voltage converter circuit provided in a stage subsequent to the rectifier circuit.

According to the invention, it is possible for the rectifier circuit alternating current input to have a high power factor, even when the power supply device is connected to an alternating current power supply with differing power supply voltages. As a result of this, it is possible to provide a small sized power supply device with a high input power factor.

DETAILED DESCRIPTION OF THE EMBODIMENTS

Figure 1:
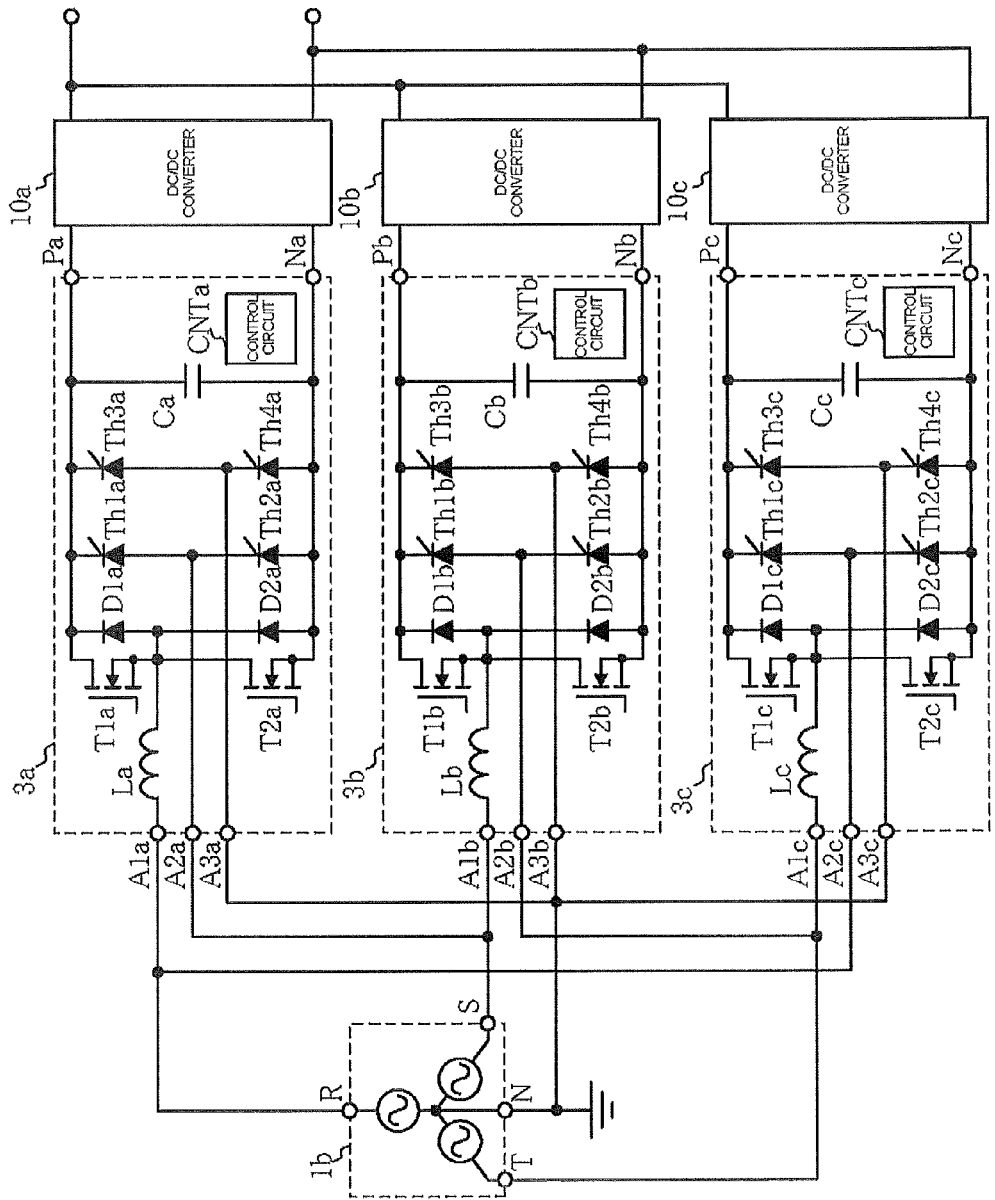
FIG. 1 is a diagram for illustrating a first embodiment of a power supply device according to the invention.

Hereafter, a detailed description will be given of embodiments of the invention, referring to FIGS. 1 and 2. Components in FIGS. 1 and 2 that are the same as those in a power supply device shown in FIG. 3 are given the same reference characters and numerals, and a description thereof is omitted.

FIG. 1 is a diagram for illustrating a first embodiment of the power supply device according to the invention. In FIG. 1, reference numeral 1b is a three-phase alternating current power supply, reference numerals 3a, 3b, and 3c are rectifier circuits, and reference numerals 10a, 10b, and 10c are isolated DC/DC converters. The rectifier circuits 3a, 3b, and 3c have the same circuit configuration, and perform the same circuit operation. Consequently, hereafter, the circuit configuration and circuit operation will be described with the rectifier circuit 3a as a representative.

The three-phase alternating current power supply 1b is a power supply wherein an R-phase, an S-phase, and a T-phase are star connected, and includes terminals R, S, and T of each phase, and a neutral point terminal N.

The rectifier circuit 3a includes alternating current input terminals A1a, A2a, and A3a, and direct current output terminals Pa and Na. The terminal A1a is connected to the terminal R of the three-phase alternating current power supply 1b. The terminal A2a is connected to the terminal S of the three-phase alternating current power supply 1b. The terminal A3a is connected to the neutral point N of the three-phase alternating current power supply 1b.

A first series circuit wherein transistors T1a and T2a are connected in series, a second series circuit wherein thyristors Th1a and Th2a are connected in series, a third series circuit wherein thyristors Th3a and Th4a are connected in series, and a capacitor Ca are connected in parallel between the terminals Pa and Na. Diodes D1a and D2a are connected in parallel to the transistors T1a and T2a respectively.

A connection point of the transistors T1a and T2a of the first series circuit is connected to the terminal A1a via an inductor La. A connection point of the thyristors Th1a and Th2a of the second series circuit is connected to the terminal A2a. A connection point of the thyristors Th3a and Th4a of the third series circuit is connected to the terminal A3a.

Furthermore, the rectifier circuit 3a includes a control circuit CNTa for generating gate signals of the transistors T1a and T2a and thyristors Th1a to Th4a.

A first circuit is configured of the first series circuit, second series circuit, and inductor La. Also, a second circuit is configured of the first series circuit, third series circuit, and inductor La.

With the circuit configurations, an alternating current voltage of the three-phase alternating current power supply 1b is converted by the rectifier circuit 3a into a direct current voltage of a first predetermined value. The direct current voltage of the first predetermined value output from the rectifier circuit 3a is input into a DC/DC converter 10a, and converted into a direct current voltage of a third predetermined value.

Hereafter, a description will be given of an operation (a first mode operation) of the rectifier circuit 3a when the three-phase alternating current power supply 1b is a 200V power supply. Firstly, when the voltage of the terminal R with respect to the terminal S of the three-phase alternating current power supply 1b is positive, an off signal is input into the gate of the thyristor Th1a, and an on signal is input into the gate of the thyristor Th2a. An off signal is input into the gates of the thyristors Th3a and Th4a. In this condition, an off signal is input into the gate of the transistor T1a, and a pulse width modulated on-off signal is input into the gate of the transistor T2a.

By controlling the semiconductor switching elements of the first to third series circuits in the way heretofore described, a current flows along a path from the terminal R of the three-phase alternating current power supply 1b, through the inductor La, transistor T2a, and thyristor Th2a, to the terminal S of the three-phase alternating current power supply 1b, when the transistor T2a is on. When the transistor T2a is turned off, the current that has been flowing along the heretofore described path flows along a path from the terminal R of the three-phase alternating current power supply 1b, through the inductor La, diode D1a, capacitor Ca, and thyristor Th2a, to the terminal S of the three-phase alternating current power supply 1b. The capacitor Ca is charged to a first predetermined value by this current.

Meanwhile, when the voltage of the terminal R with respect to the terminal S of the three-phase alternating current power supply 1b is negative, an on signal is input into the gate of the thyristor Th1a, and an off signal is input into the gate of the thyristor Th2a. An off signal is input into the gates of the thyristors Th3a and Th4a. In this condition, an off signal is input into the gate of the transistor T2a. A pulse width modulated on-off signal is input into the gate of the transistor T1a.

By controlling the semiconductor switching elements of the first to third series circuits in the way heretofore described, a current flows along a path from the terminal S of the three-phase alternating current power supply 1b, through the thyristor Th1a, transistor T1a, and inductor La, to the terminal R of the three-phase alternating current power supply 1b, when the transistor T1a is on. When the transistor T1a is turned off, the current that has been flowing along the heretofore described path flows along a path from the terminal S of the three-phase alternating current power supply 1b, through the thyristor Th1a, capacitor Ca, diode D2a, and inductor La, to the terminal R of the three-phase alternating current power supply 1b. The capacitor Ca is charged to the first predetermined value by this current.

In the heretofore described operation, the on-off signals input into the gates of the transistors T1a and T2a are regulated by the control circuit CNTa so that the input voltage and input current of the rectifier circuit 3a are of the same phase, and that the direct current output voltage is maintained at the first predetermined value. The first predetermined value is greater than an amplitude value of a line voltage generated at either end of the terminal R and terminal S.

Next, a description will be given of an operation (a second mode operation) of the rectifier circuit 3a when the three-phase alternating current power supply 1b is a 400V power supply. Firstly, when the voltage of the terminal R with respect to the terminal N of the three-phase alternating current power supply 1b is positive, an off signal is input into the gates of the thyristors Th1a and Th2a. An off signal is input into the gate of the thyristor Th3a, and an on signal is input into the gate of the thyristor Th4a. In this condition, an off signal is input into the gate of the transistor T1a, and a pulse width modulated on-off signal is input into the gate of the transistor T2a.

By controlling the semiconductor switching elements of the first to third series circuits in the way heretofore described, a current flows along a path from the terminal R of the three-phase alternating current power supply 1b, through the inductor La, transistor T2a, and thyristor Th4a, to the terminal N of the three-phase alternating current power supply 1b, when the transistor T2a is on. When the transistor T2a is turned off, the current that has been flowing along the heretofore described path flows along a path from the terminal R of the three-phase alternating current power supply 1b, through the inductor La, diode D1a, capacitor Ca, and thyristor Th4a, to the terminal N of the three-phase alternating current power supply 1b. The capacitor Ca is charged to a second predetermined value by this current.

Meanwhile, when the voltage of the terminal R with respect to the terminal N of the three-phase alternating current power supply 1b is negative, an off signal is input into the gates of the thyristors Th1a and Th2a. An on signal is input into the gate of the thyristor Th3a, and an off signal is input into the gate of the thyristor Th4a. In this condition, an off signal is input into the gate of the transistor T2a. A pulse width modulated on-off signal is input into the gate of the transistor T1a.

By controlling the semiconductor switching elements of the first to third series circuits in the way heretofore described, a current flows along a path from the terminal N of the three-phase alternating current power supply 1b, through the thyristor Th3a, transistor T1a, and inductor La, to the terminal R of the three-phase alternating current power supply 1b, when the transistor T1a is on. When the transistor T1a is turned off, the current that has been flowing along the heretofore described path flows along a path from the terminal N of the three-phase alternating current power supply 1b, through the thyristor Th3a, capacitor Ca, diode D2a, and inductor La, to the terminal R of the three-phase alternating current power supply 1b. The capacitor Ca is charged to the second predetermined value by this current.

In the heretofore described operation, the on-off signals input into the gates of the transistors T1a and T2a are regulated by the control circuit CNTa so that the input voltage and input current of the rectifier circuit 3a are of the same phase, and that the direct current output voltage is maintained at the second predetermined value. The second predetermined value is greater than an amplitude value of a phase voltage generated at either end of the terminal R and terminal N.

The DC/DC converter 10a converts the voltage across the capacitor Ca charged to the first predetermined value or second predetermined value (the direct current voltage of the first predetermined value or second predetermined value) into a direct current voltage of the third predetermined value, and outputs the voltage. In this case, the first predetermined value and second predetermined value of the direct current voltage may be the same value, or they may be differing values. When the first predetermined value and second predetermined value of the direct current voltage are the same value, or values near to each other, it is possible to reduce the input voltage range of the DC/DC converter 10a.

The circuit of the rectifier circuit 3b and DC/DC converter 10b, and the circuit of the rectifier circuit 3c and DC/DC converter 10c, also perform the same operation as the circuit of the rectifier circuit 3a and DC/DC converter 10a. The output terminals of the DC/DC converters 10a, 10b, and 10c are connected in parallel, and the direct current output voltages are supplied to the same load.

Whether the voltage of the alternating current power supply 1b is 200V or 400V can be determined by, for example, detecting the line voltage or phase voltage of the alternating current power supply, determining that it is a 200V power supply when the detected value is a value equivalent to 300V or less, and determining that it is a 400V power supply when the detected value exceeds a value equivalent to 300V.

In the heretofore described first embodiment, the input power factor of the rectifier circuits 3a to 3c can be maintained at a high power factor of approximately 1.0, regardless of whether the power supply voltage of the three-phase alternating current power supply 1b is 200V or 400V. For this reason, the input current of the rectifier circuits 3a to 3c is reduced in comparison with that of a full wave bridge rectifier circuit formed by diodes or a hybrid bridge rectifier circuit formed by thyristors and diodes. Because of this, as it is possible to reduce the input current capacity of the power supply device, it is possible to provide a small sized power supply device with a high power factor.

Figure 2:
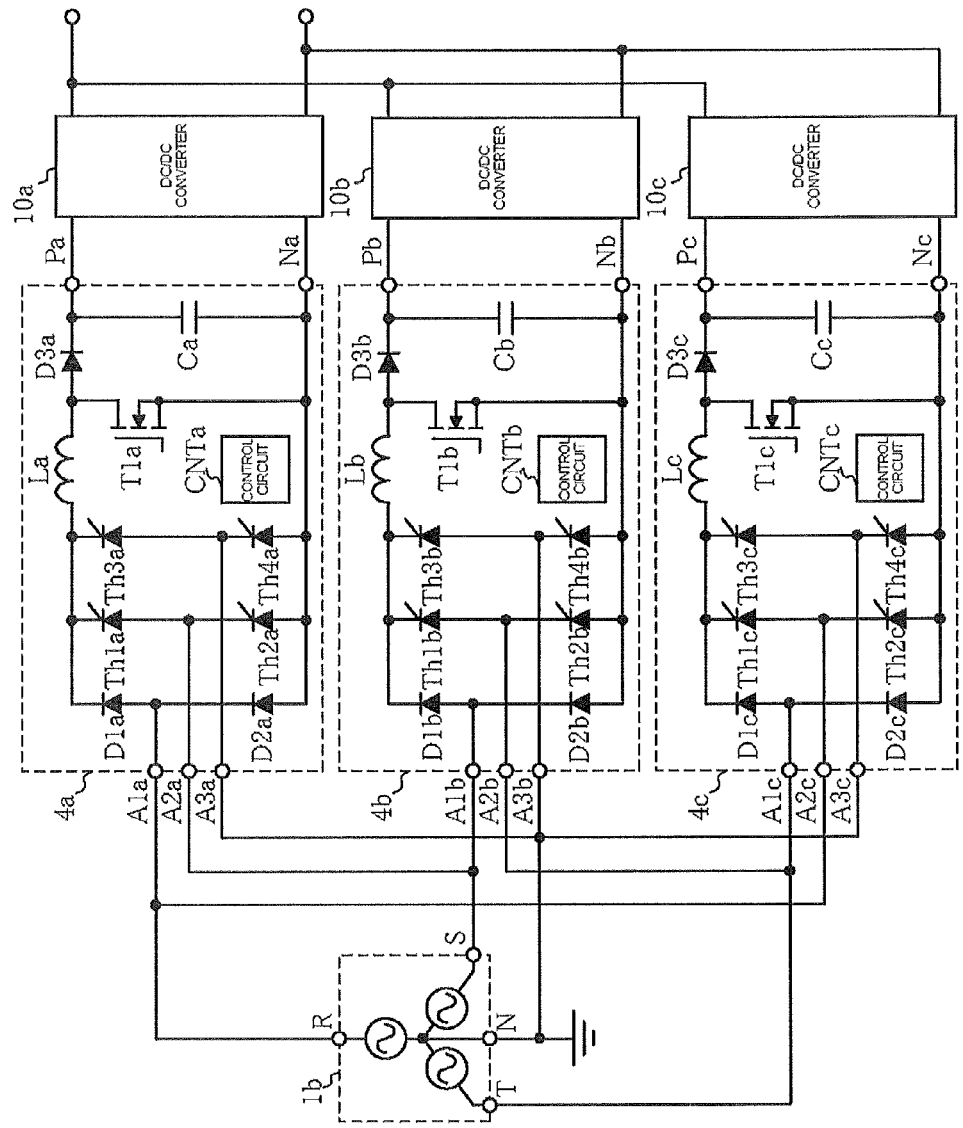
FIG. 2 is a diagram for illustrating a second embodiment of the power supply device according to the invention.
Figure 3:
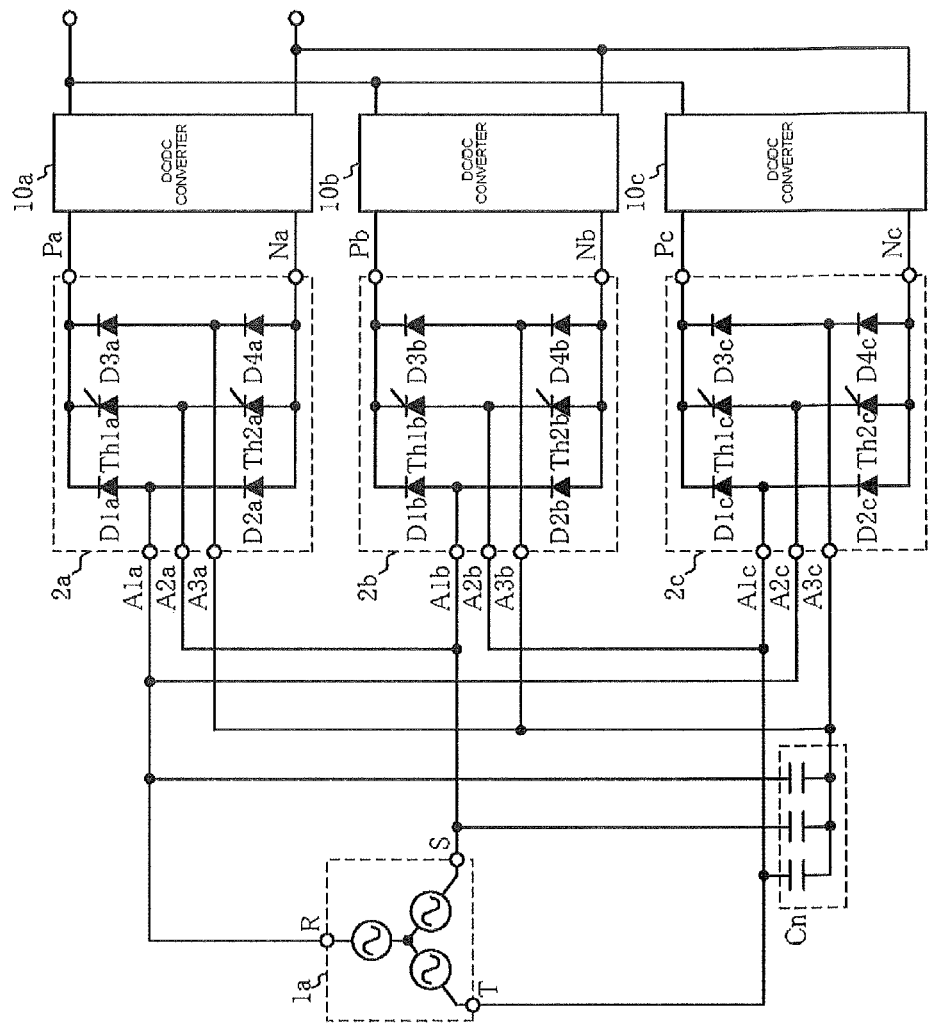
FIG. 3 is a diagram for illustrating a power supply device according to a heretofore known technology.

FIG. 2 is a diagram for illustrating a second embodiment of the power supply device according to the invention. In FIG. 2, reference numeral 1b is the three-phase alternating current power supply, reference numerals 4a, 4b, and 4c are rectifier circuits, and reference numerals 10a, 10b, and 10c are the isolated DC/DC converters. The rectifier circuits 4a, 4b, and 4c have the same circuit configuration, and perform the same circuit operation. Consequently, hereafter, the circuit configuration and circuit operation will be described with the rectifier circuit 4a as a representative.

The rectifier circuit 4a includes the alternating current input terminals A1a, A2a, and A3a, and direct current output terminals Pa and Na. The terminal A1a is connected to the terminal R of the three-phase alternating current power supply 1b. The terminal A2a is connected to the terminal S of the three-phase alternating current power supply 1b. The terminal A3a is connected to the neutral point N of the three-phase alternating current power supply 1b.

A first series circuit wherein the diodes D1a and D2a are connected in series, a second series circuit wherein the thyristors Th1a and Th2a are connected in series, a third series circuit wherein the thyristors Th3a and Th4a are connected in series, and a fourth series circuit wherein the inductor La and transistor T1a are connected in series, are connected in parallel between the terminals Pa and Na. A connection point of the diodes D1a and D2a of the first series circuit is connected to the terminal A1a. A connection point of the thyristors Th1a and Th2a of the second series circuit is connected to the terminal A2a. A connection point of the thyristors Th3a and Th4a of the third series circuit is connected to the terminal A3a. A fifth series circuit is connected in parallel to either end of the transistor T1a of the fourth series circuit. Both ends of the capacitor Ca of the fifth series circuit are connected to the terminals Pa and Na.

The rectifier circuit 4a includes the control circuit CNTa for generating gate signals of the transistors T1a and thyristors Th1a to Th4a.

The first circuit is configured of the first series circuit, second series circuit, fourth series circuit, and fifth series circuit. Also, the second circuit is configured of the first series circuit, and third to fifth series circuits.

With the circuit configurations, an alternating current voltage of the three-phase alternating current power supply 1b is converted by the rectifier circuit 4a into a direct current voltage of the first predetermined value. The direct current voltage of the first predetermined value output from the rectifier circuit 4a is input into the DC/DC converter 10a, and converted into a direct current voltage of the third predetermined value.

Hereafter, a description will be given of an operation (the first mode operation) of the rectifier circuit 4a when the three-phase alternating current power supply 1b is a 200V power supply. Firstly, when the voltage of the terminal R of the three-phase alternating current power supply 1b is positive with respect to the terminal S, an off signal is input into the gate of the thyristor Th1a, and an on signal is input into the gate of the thyristor Th2a. An off signal is input into the gates of the thyristors Th3a and Th4a. In this condition, a pulse width modulated on-off signal is input into the gate of the transistor T1a.

By controlling the semiconductor switching elements of the second to fourth series circuits in the way heretofore described, a current flows along a path from the terminal R of the three-phase alternating current power supply 1b, through the diode D1a, inductor La, transistor T1a, and thyristor Th2a, to the terminal S of the three-phase alternating current power supply 1b, when the transistor T1a is on. When the transistor T1a is turned off, the current that has been flowing along the heretofore described path flows along a path from the terminal R of the three-phase alternating current power supply 1b, through the diode D1a, inductor La, diode D3a, capacitor Ca, and thyristor Th2a, to the terminal S of the three-phase alternating current power supply 1b. The capacitor Ca is charged to the first predetermined value by this current.

Meanwhile, when the voltage of the terminal R of the three-phase alternating current power supply 1b is negative with respect to the terminal 5, an on signal is input into the gate of the thyristor Th1a, and an off signal is input into the gate of the thyristor Th2a. An off signal is input into the gates of the thyristors Th3a and Th4a. In this condition, a pulse width modulated on-off signal is input into the gate of the transistor T1a.

By controlling the semiconductor switching elements of the second to fourth series circuits in the way heretofore described, a current flows along a path from the terminal S of the three-phase alternating current power supply 1b, through the thyristor Th1a, inductor La, transistor T1a, and diode D2a, to the terminal R of the three-phase alternating current power supply 1b, when the transistor T1a is on. When the transistor T1a is turned off, the current that has been flowing along the heretofore described path flows along a path from the terminal S of the three-phase alternating current power supply 1b, through the thyristor Th1a, inductor La, diode D3a, capacitor Ca, and diode D2a, to the terminal R of the three-phase alternating current power supply 1b. The capacitor Ca is charged to the first predetermined value by this current.

In the heretofore described operation, the on-off signal input into the gate of the transistor T1a is regulated by the control circuit CNTa so that the input voltage and input current of the rectifier circuit 4a are of the same phase, and that the direct current output voltage is maintained at the first predetermined value. The first predetermined value is greater than an amplitude value of a line voltage generated at either end of the terminal R and terminal S.

Next, a description will be given of an operation (the second mode operation) of the rectifier circuit 4a when the three-phase alternating current power supply 1b is a 400V power supply. Firstly, when the voltage of the terminal R of the three-phase alternating current power supply 1b is positive with respect to the terminal N, an off signal is input into the gates of the thyristors Th1a and Th2a. An off signal is input into the gate of the thyristor Th3a, and an on signal is input into the gate of the thyristor Th4a. In this condition, a pulse width modulated on-off signal is input into the gate of the transistor T1a.

By controlling the semiconductor switching elements of the second to fourth series circuits in the way heretofore described, a current flows along a path from the terminal R of the three-phase alternating current power supply 1b, through the diode D1a, inductor La, transistor T1a, and thyristor Th4a, to the terminal N of the three-phase alternating current power supply 1b, when the transistor T1a is on. When the transistor T1a is turned off, the current that has been flowing along the heretofore described path flows along a path from the terminal R of the three-phase alternating current power supply 1b, through the diode D1a, inductor La, diode D3a, capacitor Ca, and thyristor Th4a, to the terminal N of the three-phase alternating current power supply 1b. The capacitor Ca is charged to the second predetermined value by this current.

Meanwhile, when the voltage of the terminal R of the three-phase alternating current power supply 1b is negative with respect to the terminal N, an off signal is input into the gates of the thyristors Th1a and Th2a. An on signal is input into the gate of the thyristor Th3a, and an off signal is input into the gate of the thyristor Th4a. In this condition, a pulse width modulated on-off signal is input into the gate of the transistor T1a.

By controlling the semiconductor switching elements of the second to fourth series circuits in the way heretofore described, a current flows along a path from the terminal R of the three-phase alternating current power supply 1b, through the diode D1a, inductor La, transistor T1a, and thyristor Th4a, to the terminal N of the three-phase alternating current power supply 1b, when the transistor T1a is on. When the transistor T1a is turned off, the current that has been flowing along the heretofore described path flows along a path from the terminal R of the three-phase alternating current power supply 1b, through the diode D1a, inductor La, diode D3a, capacitor Ca, and thyristor Th4a, to the terminal N of the three-phase alternating current power supply 1b. The capacitor Ca is charged to the second predetermined value by this current.

In the heretofore described operation, the on-off signal input into the gate of the transistor T1a is regulated by the control circuit CNTa so that the input voltage and input current of the rectifier circuit 4a are of the same phase, and that the direct current output voltage is maintained at the second predetermined value. The second predetermined value is greater than an amplitude value of a phase voltage generated at either end of the terminal R and terminal N.

The DC/DC converter 10a converts the direct current voltage charged to the first predetermined value or second predetermined value into a direct current voltage of the third predetermined value, and outputs the voltage. In this case, the first predetermined value and second predetermined value may be the same value, or they may be differing values. When the first predetermined value and second predetermined value of the direct current voltage are the same value, or values near to each other, it is possible to reduce the input voltage range of the DC/DC converter 10a.

The circuit of the rectifier circuit 3b and DC/DC converter 10b, and the circuit of the rectifier circuit 3c and DC/DC converter 10c, also perform the same operation as the circuit of the rectifier circuit 3a and DC/DC converter 10a. The output terminals of the DC/DC converters 10a, 10b, and 10c are connected in parallel, and the direct current output voltages are supplied to the same load.

Whether the voltage of the alternating current power supply 1b is 200V or 400V can be determined by, for example, detecting the line voltage or phase voltage of the alternating current power supply, determining that it is a 200V power supply when the detected value is a value equivalent to 300V or less, and determining that it is a 400V power supply when the detected value exceeds a value equivalent to 300V.

In the heretofore described second embodiment, the input power factor of the rectifier circuits 4a to 4c can be maintained at a high power factor of approximately 1.0, regardless of whether the power supply voltage of the three-phase alternating current power supply 1b is 200V or 400V. For this reason, the input current of the rectifier circuits 4a to 4c is reduced in comparison with that of a full wave bridge rectifier circuit formed by diodes or a hybrid bridge rectifier circuit formed by a thyristor and diodes. Because of this, as it is possible to reduce the input current capacity of the power supply device, it is possible to provide a small sized power supply device with a high power factor.

In the first embodiment and second embodiment, a third series circuit formed by diodes D3a and D4a of a rectifier circuit 2a shown in FIG. 3 is replaced with the series circuit formed by the thyristors Th3a and Th4a. By so doing, it is possible to select either the first mode or second mode, and it is possible to provide a power supply device with a high power factor, whichever mode the rectifier circuit is operating in.

Also, in the first embodiment and second embodiment, a description has been given of the power supply device according to the invention with the three-phase alternating current power supply as either a 200V power supply or 400V power supply. However, the combination of power supplies not being limited to this, the power supplies may be a 100V power supply and 200V power supply, or may be another combination of power supplies.

Also, the invention, not being limited to a power supply device for a three-phase alternating current power supply, can be applied to a power supply device that converts the voltage of an alternating current power supply formed by N phases (N is a natural number of two or more) into a direct current voltage. Furthermore, the invention, not being limited to a power supply device that rectifies all the phase and line voltages of an N-phase alternating current power supply, may be a power supply device that rectifies a predetermined phase voltage and line voltage.

What is claimed is:

1. A power supply device that converts the voltage of an alternating current power supply having N phases (N is a natural number of two or more) into a direct current voltage, comprising:

M (M is a natural number equal to or greater than one, and equal to or smaller than N) rectifier circuits, each rectifier circuit including:
  a first alternating current input terminal connected to receive one predetermined phase of the alternating current power supply;
  a second alternating current input terminal connected to receive another predetermined phase of the alternating current power supply;
  a third alternating current input terminal connected to a neutral point of the alternating current power supply;
  positive side and negative side direct current output terminals;
  a first series circuit having first and second semiconductor switching elements that are connected in series;
  first and second diodes connected in reverse parallel to the first and second semiconductor switching elements respectively;
  a second series circuit having first and second thyristors that are connected in series;
  a third series circuit having third and fourth thyristors that are connected in series;
  a capacitor; and
  an inductor,
wherein the first and second diodes form a further series circuit,
wherein the first to third series circuits, the further series circuit, and the capacitor are connected in parallel between the positive side and negative side direct current output terminals,
wherein the inductor is connected between the first alternating current input terminal and a connection point of the first semiconductor switching element and second semiconductor switching element of the first series circuit, and
wherein each rectifier circuit operates in:
  a first mode in which a line voltage of the alternating current power supply is converted into a direct current voltage of a first predetermined value by the first and second thyristors of the second series circuit being put into a conductive state and a non-conductive state in alternation, the third and fourth thyristors of the third series circuit both being put into a non-conductive state, one of the first and second semiconductor switching elements of the first series circuit being turned off continuously during operation in the first mode, the other of the first and second semiconductor switching elements being caused to perform an on-off operation during operation in the first mode, and an alternating current of the same phase as the line voltage of the alternating current power supply being input; and a second mode in which a phase voltage of the alternating current power supply is converted into a direct current voltage of a second predetermined value by the first and second thyristors of the second series circuit both being put into a non-conductive state, the third and fourth thyristors of the third series circuit being put into a conductive state and a non-conductive state in alternation, one of the first and second semiconductor switching elements of the first series circuit being turned off continuously during operation in the second mode, the other of the first and second semiconductor switching elements being caused to perform an on-off operation during operation in the second mode, and an alternating current of the same phase as the phase voltage of the alternating current power supply being input.

2. The power supply device according to claim 1, wherein each rectifier circuit operates in the first mode when the effective value of the voltage of the alternating current power supply is a predetermined value or less, and operates in the second mode when the effective value of the voltage of the alternating current power supply exceeds the predetermined value.

3. The power supply device according to claim 1, wherein the first predetermined value and second predetermined value of the direct current voltage are the same.

4. A power supply device that converts the voltage of an alternating current power supply having N phases (N is a natural number of two or more) into a direct current voltage, comprising:

M (M is a natural number equal to or greater than one, and equal to or smaller than N) rectifier circuits, each rectifier circuit including:

a first alternating current input terminal connected to receive one predetermined phase of the alternating current power supply;

a second alternating current input terminal connected to receive to another predetermined phase of the alternating current power supply;

a third alternating current input terminal connected to a neutral point of the alternating current power supply;

positive side and negative side direct current output terminals;

a first series circuit in which first and second diodes are connected in series, and a connection point of the first and second diodes is connected to the first alternating current input terminal;

a second series circuit in which first and second thyristors are connected in series, and a connection point of the first and second thyristors is connected to the second alternating current input terminal;

a third series circuit in which third and fourth thyristors are connected in series, and a connection point of the third and fourth thyristors is connected to the third alternating current input terminal;

a fourth series circuit in which an inductor and a semiconductor switching element are connected in series; and a fifth series circuit in which a diode and a capacitor are connected in series, wherein the first to fourth series circuits are connected in parallel, and wherein the fifth series circuit is connected to either end of the semiconductor switching element of the fourth series circuit, the capacitor of the fifth series circuit being connected between the positive side and negative side direct current output terminals, and wherein each rectifier circuit operates in:

a first mode in which power is supplied to a load and in which a line voltage of the alternating current power supply is converted into a direct current voltage of a first predetermined value by the first and second thyristors of the second series circuit being put into a conductive state and a non-conductive state in alternation, the third and fourth thyristors of the third series circuit both being put into a non-conductive state, the semiconductor switching element of the fourth series circuit being caused to perform an on-off operation, and an alternating current of the same phase as the line voltage of the alternating current power supply being input; and a second mode in which power is supplied to a load and in which a phase voltage of the alternating current power supply is converted into a direct current voltage of a second predetermined value by the first and second thyristors of the second series circuit both being put into a non-conductive state, the third and fourth thyristors of the third series circuit being put into a conductive state and a non-conductive state in alternation, the semiconductor switching element of the fourth series circuit being caused to perform an on-off operation, and an alternating current of the same phase as the phase voltage of the alternating current power supply being input.

5. The power supply device according to claim 4, wherein each rectifier circuit operates in the first mode when the effective value of the voltage of the alternating current power supply is a predetermined value or less, and operates in the second mode when the effective value of the voltage of the alternating current power supply exceeds the predetermined value.

6. The power supply device according to claim 4, wherein the first predetermined value and second predetermined value of the direct current voltage are the same.

* * * * *